No. 680,649. Patented Aug. 13, 1901.
H. S. CROMBIE.
UNION COUPLING.
(Application filed Feb. 25, 1901.)

(No Model.)

WITNESSES.
Henry Marsh.
Lillian J. Basford.

INVENTOR.
Herbert S. Crombie,
by Teschemacher
Atty.

THE NORRIS PETERS CO., PHOTO-LITHO., WASHINGTON, D. C.

UNITED STATES PATENT OFFICE.

HERBERT S. CROMBIE, OF WOBURN, MASSACHUSETTS, ASSIGNOR TO THE JEFFERSON MANUFACTURING COMPANY, OF SAME PLACE.

UNION-COUPLING.

SPECIFICATION forming part of Letters Patent No. 680,649, dated August 13, 1901.

Application filed February 25, 1901. Serial No. 48,832. (No model.)

*To all whom it may concern:*

Be it known that I, HERBERT S. CROMBIE, a citizen of the United States, residing at Woburn, in the county of Middlesex and State of Massachusetts, have invented certain new and useful Improvements in Union-Couplings, of which the following is a specification.

My invention relates to union-couplings in which a hard-metal packing ring or seat is permanently and securely fastened within a recess in the member of the coupling to which it is applied. In couplings of this description as heretofore constructed the interior diameter of the packing-ring was equal to or less than that of the screw-threaded interior of the coupling member to which it was applied, so that the inner end of the packing-ring formed a shoulder against which the thread of a pipe if screwed far enough into the coupling, as often occurs, would strike, causing the packing-ring to be forced out of place or jammed, thus injuring the coupling. To overcome this difficulty is the object of my invention, which consists in the combination, with two opposing members of a coupling held together by a nut or by means of flanges and bolts, of a metal packing ring or seat permanently secured within an annular recess in one of said members and having its interior diameter greater than that of the threaded bore of the coupling, whereby the inner wall of the recess in which said ring is placed is caused to form an annular protecting-flange lying wholly within the packing-ring, which is thus held securely in place and at the same time entirely removed from the path of a pipe screwed into the coupling, which cannot under any circumstances come into contact with the packing-ring, as hereinafter more fully set forth.

Figure 1:
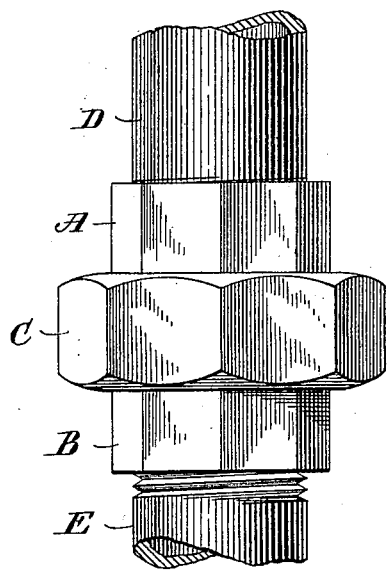
Figure 2:
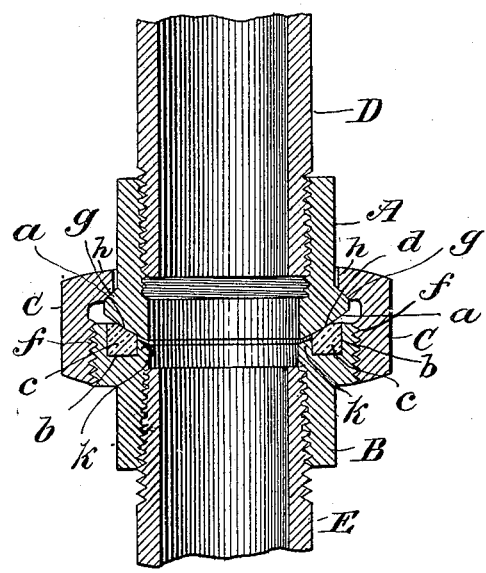
Figure 3:
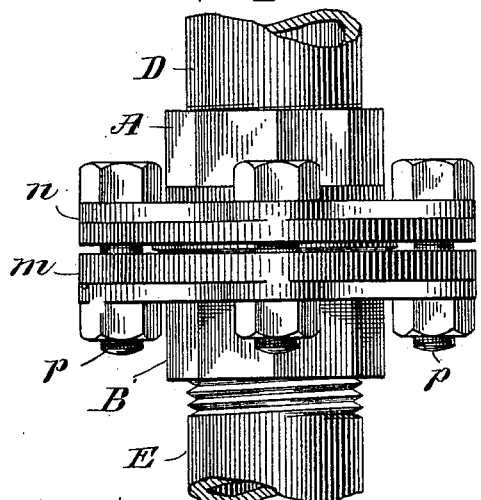
Figure 4:
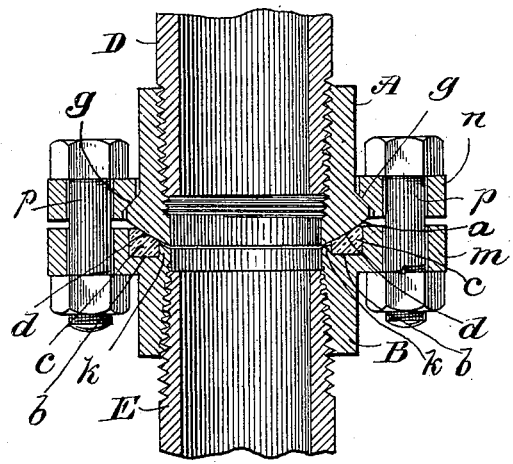

In the accompanying drawings, Figure 1 is a side elevation of my improved union-coupling. Fig. 2 is a longitudinal vertical section of the same. Fig. 3 is a side elevation illustrating the application of my invention to a modified form of coupling. Fig. 4 is a longitudinal vertical section of the same.

In Figs. 1 and 2 of the accompanying drawings, A represents the male member of the coupling, which is provided with a convex face $a$, and B represents the female member, within the opposing face of which is formed an annular recess $b$, in which is permanently secured, by driving it therein or in other suitable manner, a metal packing-ring $c$, preferably of bronze or brass, said ring having a concave face $d$, against which bears the convex face $a$ of the member A, said members A and B being interiorly threaded to receive the correspondingly-threaded ends of the pipes D E, which are connected by means of the coupling.

C is the coupling-nut, which is interiorly threaded, as usual, at $f$, the female member B being correspondingly threaded to engage the threaded portion of the nut, while the male member is provided with a shoulder $g$, having an outer convex or beveled surface, against which bears the correspondingly curved or concave interior surface of the inwardly-projecting flange $h$ of the coupling-nut C, which thus holds the two members A B together in such manner as to permit of a movement of one upon the other in the arc of a circle without any liability of leakage in case the pipes which are connected by said coupling should be thrown or moved out of alinement by accident or design or if it should be found necessary to couple two pipes together which are not in a perfectly straight line.

The interior diameter of the packing-ring $c$ is greater than that of the threaded interior surface or bore of the member B and consequently the inner wall of the recess $b$ forms an annular flange $k$, lying wholly inside the packing-ring $c$, as shown in Fig. 2, and forming a protector therefor, which also serves to securely hold the ring within its recess against any liability of displacement, the ring being surrounded on all sides except its concave face by the metal of which the member B is composed, and as no portion of the ring projects into the threaded interior of the coupling it is impossible for the end of the pipe E when screwed into the coupling to come into contact therewith under any circumstances whatever, and consequently the packing-ring always remains in place, being protected on all sides except its concave face by the metal walls of the recess $b$ within which it is placed.

Figs. 3 and 4 illustrate the application of my invention to a coupling the two members of which are connected by means of external flanges $m$ $n$, spaced apart, and bolts $p$, the flange $m$ being formed integral with the member B, while the flange $n$ consists of an independent annulus or ring loosely slipped over the outer end of the member A and taking a bearing against its shoulder $g$, the surface of which is convex and forms a seat for the correspondingly-concave inner periphery of the ring-shaped flange $n$. No portion of the packing-ring $c$ extends into the space between the flanges which are spaced apart when held by the bolts $p$, and consequently the packing-ring does not in any manner interfere with the free movement in the arc of a circle of one member upon the other.

That portion of the construction of the coupling by means of which one member is permitted to move in the arc of a circle upon the other member forms, however, no part of my invention, which relates wholly to the manner in which the metal packing-ring is applied so as to receive protection on all sides except its working face and remain securely and permanently in place without any liability of being displaced or injured by the pipe while being screwed into the coupling.

What I claim as my invention, and desire to secure by Letters Patent, is—

A pipe-coupling comprising the member A, having a convex or rounded end face $a$, the opposing member B, having a concave end face corresponding with the face $a$ and formed with an annular recess $b$ closed at its side next the bore by the flange $k$, the metallic packing-ring $c$ secured in said recess wholly exterior to the bore of the member B and having a concave face engaging the convex face of the member A, and means for coupling the coupling members together constructed to permit them to move independently of each other in the arc of a circle.

Witness my hand this 20th day of February, A. D. 1901.

HERBERT S. CROMBIE.

In presence of—
P. E. TESCHEMACHER,
LILLIAN I. BASFORD.